Aug. 2, 1949.                    R. BIRMANN                    2,477,683
                    COMPRESSED AIR AND COMBUSTION GAS
                        FLOW IN TURBINE POWER PLANT
                           Filed Sept. 30, 1942
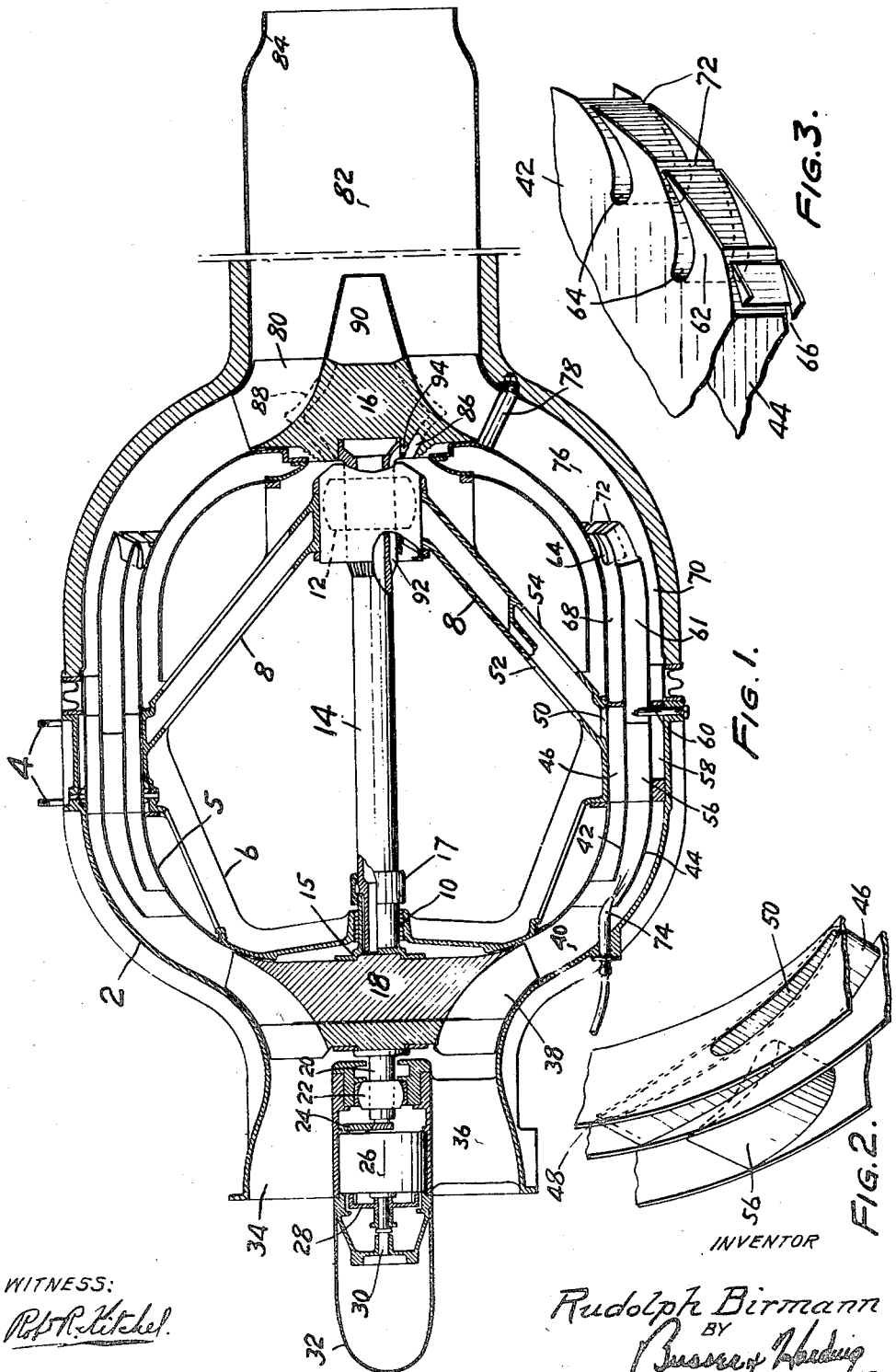
WITNESS:
*Rob'tR.Kitchel.*
INVENTOR
*Rudolph Birmann*
BY
*Busser & Harding*
ATTORNEYS Patented Aug. 2, 1949

2,477,683

UNITED STATES PATENT OFFICE 2,477,683

COMPRESSED AIR AND COMBUSTION GAS FLOW IN TURBINE POWER PLANT

Rudolph Birmann, Newtown, Pa., assignor, by mesne assignments, to Turbo Engineering Corporation, a corporation of Delaware Application September 30, 1942, Serial No. 460,235

1 Claim. (Cl. 60—41)

This invention relates to a gas turbine power plant involving the use of a turbine operating on combustion gases, which unit is adapted primarily for the propulsion of aircraft, though it will be evident that various features thereof are applicable for other power producing purposes.

One object of the present invention is to provide a gas turbine power plant involving an improved efficient handling of the air utilized both for supporting combustion and as excess air for the drive of a turbine.

A further object of the invention is to provide an arrangement in which spin of an air stream resulting from the operation of a compressor is carried directly to a turbine inlet except for a part of the air which supports combustion. This latter air is caused to flow under conditions to maintain a proper flame. These and other objects of the invention will become apparent from the following description, read in conjunction with the accompanying drawing, in which:

Figure 1 is an axial sectional view through one form of power plant adapted for carrying out the principles of the invention;

Figure 2 is a fragmentary perspective view showing certain details of a guide and diffuser vane arrangement shown in Figure 1; and Figure 3 is a fragmentary perspective view showing certain details of a guide vane arrangement shown in Figure 1.

While reference is made herein particularly to a power plant for aircraft, and the major features of the invention are primarily related thereto inasmuch as they usually involve high velocities of a craft for utility, it will be evident hereafter that the various features of the invention are not limited necessarily to aircraft, but are applicable, for example, to high speed boats or land vehicles. For simplicity of description, however, reference will be primarily made to aircraft applications.

Referring to the unit shown in Figure 1, this comprises a housing 2 adapted to be mounted in suitable position in the aircraft through the medium of pads and studs indicated at 4. The central portion of the unit provides an annular region which is inwardly limited by a wall 5 within which are located various ribs 6 and 8 of a casting which carries the labyrinthine packing 10 and the bearing 12 for the turbine shaft 14 carrying in overhanging fashion the turbine wheel 16. The bearing 12 is of the general type described in my Patents 2,403,489 and 2,440,890, dated, respectively, July 9, 1946, and May 4, 1948. At its forward end the shaft 14 is splined to the stub shaft 15 secured to the impeller 18, the hub of which is preferably solid. A coupling nut 17 holds the shaft 14 and stub shaft 15 in assembled relationship. A forwardly extending stub shaft 20 secured to the impeller is mounted in a bearing 22 and serves through gearing 24 to drive an oil pump 26 and through additional gearing 28 to drive the shaft extension 30 connected to a fuel pump (not shown) which may be located within a streamlined fairing 32.

The forward end of the housing is provided with an opening 34 which is flanged to permit connection with the intake duct located in any suitable position in the aircraft, desirably opening forwardly so that the ram effect resulting as the craft moves through the air furnishes an initial stage of compression in advance of the impeller, the opening being, for example, in the form of one or more slots in the leading edges of the wings, or louvres on the sides or bottom of the fuselage, or the like. The bearing assembly indicated may be carried by suitable struts, one of which is shown at 36, which struts are desirably streamlined and offset from the axis, as disclosed in my Patent 2,405,283, dated August 6, 1946, to minimize impact shock at the inlet edges of the impeller vanes which might give rise to destructive vibration. The air from the impeller passages 38 enters the annular region 40 and is then distributed among three annular passages defined by annular partition members 42 and 44. In the innermost of these annular passages or regions there are provided guide vanes 46 the form of which will be clear from consideration of Figure 2. These guide vanes are designed to serve merely as guides and are so arranged as not to have any diffusing action in addition to that occurring as a result of the increase in diameter of the path of flow. As a result, the air as it reaches them has been slowed down only to the extent which results from the increased radius so that it maintains a high velocity of spin, moving in a spiral within the passage which contains the guide vanes 46. As indicated in Figure 2, the guide vanes 46 are hollow, each providing a passage diverging from an open slot 48 at its forward end so that a small amount of air is slowed down with an accompanying pressure rise and thence flows through an opening 50 into a corresponding rib 8 to be delivered through suitably arranged openings, indicated at 52 and 54, to the interior region surrounding the shaft 14 and the bearing 12. The air which flows about the guide vanes 46 then passes into the annular region 68 from which it ultimately passes into the region 76 from which driving gases are supplied to the turbine.

The air entering the region outside the partition 44 similarly passes streamlined vanes 58 with maintenance of its spin, which vanes, however, do not receive any of the air and serve merely to form a mechanical connection between the inside parts and the outer shell which is mounted in the craft. The vanes 58 surround a series of igniters 60 located as shown to provide igniting arcs immediately beyond the ends of intermediate vanes 56 located between the partitions 42 and 44.

The vanes 56, as contrasted with the guide vanes 46 and 58, are arranged to act as diffuser vanes to slow down the flow as it approaches the igniter 60, turning it to flow axially with removal of its spin and effecting an accompanying pressure rise. A series of fuel nozzles 74 presenting streamlined shape to the air flow serve for the injection of fuel between the partitions 42 and 44. These nozzles are designed to cause the fuel to spray out in diverging fashion from an annular standpoint, and the igniters 60 are provided to ignite the flowing mixture to effect burning in the regions 61 immediately beyond the diffuser vanes 56. In the region of the igniters the diffuser vanes will have removed the spin so that a continuous flow of a homogeneous fuel air mixture will occur in an axial direction.

The velocities of flow prior to the diffuser vanes are sufficiently high compared to the velocity of flame travel that backfiring of mixture through the diffuser passages will not take place. The velocity beyond the diffusers, however, is sufficiently low that combustion may properly occur, spreading from the igniters in an annular direction to secure substantially complete combustion before the mixture reaches the end of the annular passage 61.

At the outer end of the passage 61 the gases meet vanes 62 which are so arranged as to provide nozzles expanding the gases to a velocity substantially greater than the velocity of the air emerging from the passages 68 and 70 and to impart thereto high velocity of spin. As a result, the combined mass of combustion gas and air in the region 76 has a quite high velocity of spin giving it a direction for proper entrance into the bucket passages 80 of the turbine wheel 16.

The vanes 62 which define the combustion gas nozzle passages are subject to the intense heat of the combustion gases and provision is made for cooling them. This is effected by forming them in hollow fashion with communication, as indicated at 64 and 66, through the supporting partitions 42 and 44 with the air passages 68 and 70. The trailing ends of these vanes are open as indicated at 72, and in view of the higher velocity of discharge of the combustion gases as compared with the air velocity, an ejector effect takes place so that air is drawn into the vanes serving to effect their internal cooling.

In view of the imparting of a proper spin velocity to the combustion gases and the layers of air with which substantial commingling takes place it is unnecessary to provide additional nozzles adjacent the intake edges of the turbine vanes, and in this region there are only provided a small number of streamlined supporting struts 78 designed to offer a minimum of resistance to the gas flow.

The exhaust from the turbine buckets passes into the tail passage 82 which terminates as a nozzle 84 to serve for the further and complete expansion of the combustion gases to atmospheric pressure to provide a high velocity jet directed rearwardly with respect to the craft to drive the same. Whether or not the nozzle 84 is desirable depends largely upon the extent of the tail passage 82. If the structural features of the aircraft require a long tail passage, it is desirable that the gases leaving the turbine are not fully expanded to maximum velocity inasmuch as the friction losses within the tail passage may become too great, and a higher efficiency may be secured by the provision of a discharge nozzle 84 even though the nozzle itself involves some losses. On the other hand, if the tail passage is short the losses of a nozzle 84 may be avoided by so designing the turbine that complete expansion to atmospheric pressure is effected at the discharge therefrom, the discharged gases having an axial velocity equal to that of the desired jet without substantial spin.

The cooling of the turbine rotor is effected through the provision of air passages located therein and designed to function in the fashion described in my Patent No. 2,283,176, issued May 19, 1942. These air passages comprise impeller portions 86 and turbine portions 88, the former serving to pick up and compress air from the region about the bearing 12 and the latter serving to expand the heated air and to discharge it rearwardly at high velocity relative to the direction of rotation of the turbine wheel, thereby to recover the energy of compression and to utilize the heat energy imparted to the air by conduction from the rotor. In the present arrangement, this cooling air is caused to pass through a nozzle 90 fastened to the hub of the turbine wheel whereby it is discharged into the center portion of the tail passage 82 in such fashion that better flow condition results than if the discharge is permitted to occur directly from the passages 88 individually into the exhaust gases passing from the turbine buckets, the passages 88 being so designed in combination with the nozzle 90 that the issuing jet has a high velocity augmenting the jet flow through the passage 82.

In order to secure effective cooling of the bearing against heat which might otherwise be transmitted to it through the shaft 14 this shaft is externally grooved as indicated at 92 for the passage of air which flows through openings 94 communicating with the inner ends of passages 86.

What I claim is:

A power plant for air or other craft comprising a turbine, a compressor driven by the turbine, diffusing means for removing to a substantial extent the spin of part of the air delivered by the compressor, means for burning fuel in the air having its spin so substantially reduced, and means for providing high velocity jets of said combustion gases having substantial spin and joining them with remaining air retaining substantial spin to drive the turbine.

RUDOLPH BIRMANN.

(References on following page)

REFERENCES CITED

The following references are of record in the file of this patent:

UNITED STATES PATENTS

| Number | Name | Date |
|---|---|---|
| 1,375,601 | Morize | Apr. 19, 1921 |
| 1,879,717 | Sikorsky | Sept. 27, 1932 |
| 2,078,957 | Lysholm | May 4, 1937 |
| 2,085,761 | Lysholm | July 6, 1937 |
| 2,106,040 | Schmidt | Jan. 18, 1938 |
| 2,149,510 | Darrieus | Mar. 7, 1939 |
| 2,162,956 | Lysholm | June 20, 1939 |
| 2,168,726 | Whittle | Aug. 8, 1939 |
| 2,216,731 | Birmann | Oct. 8, 1940 |
| 2,223,744 | Stalker | Dec. 3, 1940 |
| 2,256,198 | Hahn | Sept. 16, 1941 |
| 2,280,835 | Lysholm | Apr. 28, 1942 |
| 2,283,176 | Birmann | May 19, 1942 |
| 2,289,231 | Auger et al. | July 7, 1942 |
| 2,356,557 | Anxionnaz et al. | Aug. 22, 1944 |
| 2,385,366 | Lysholm | Sept. 25, 1945 |
| 2,396,911 | Anxionnaz et al. | Mar. 9, 1946 |
| 2,404,334 | Whittle | July 16, 1946 |

FOREIGN PATENTS

| Number | Country | Date |
|---|---|---|
| 484,289 | Great Britain | May 3, 1938 |
| 495,469 | Great Britain | Feb. 8, 1937 |
| 636,026 | France | Jan. 6, 1928 |